United States Patent
Li et al.

(10) Patent No.: US 12,089,045 B2
(45) Date of Patent: Sep. 10, 2024

(54) AIR INTERFACE INFORMATION SECURITY PROTECTION METHOD AND APPARATUS

(71) Applicant: HUAWEI TECHNOLOGIES CO., LTD., Guangdong (CN)

(72) Inventors: Fei Li, Shenzhen (CN); Juan Deng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/695,145

(22) Filed: Mar. 15, 2022

(65) Prior Publication Data

US 2022/0210648 A1   Jun. 30, 2022

Related U.S. Application Data

(63) Continuation of application No. PCT/CN2020/101714, filed on Jul. 13, 2020.

(30) Foreign Application Priority Data

Sep. 16, 2019   (CN) .......................... 201910870247.1
Oct. 14, 2019   (CN) .......................... 201910974006.1

(51) Int. Cl.
*H04W 12/08*   (2021.01)
*H04L 9/32*   (2006.01)
(Continued)

(52) U.S. Cl.
CPC ......... *H04W 12/102* (2021.01); *H04L 9/3242* (2013.01); *H04W 12/03* (2021.01); *H04W 12/041* (2021.01); *H04W 92/10* (2013.01)

(58) Field of Classification Search
CPC .................................................. H04W 12/102
See application file for complete search history.

(56) References Cited

U.S. PATENT DOCUMENTS

10,728,757 B2 *   7/2020   Wu ................... H04W 36/0033
2010/0111308 A1   5/2010   Forsberg et al.
(Continued)

FOREIGN PATENT DOCUMENTS

CN   106961456 A   7/2017
CN   107071705 A   8/2017
(Continued)

OTHER PUBLICATIONS

Huawei et al., "Discussion paper on UE radio capability protection for UEs without AS security", 3GPP TSG SA WG3 Meeting #98e S3-200265,e-meeting, 2 Mar. 6, 2020, Total 4 Pages.
(Continued)

*Primary Examiner* — Ponnoreay Pich
(74) *Attorney, Agent, or Firm* — WOMBLE BOND DICKINSON (US) LLP

(57) ABSTRACT

Embodiments of this application disclose an air interface information security protection method and apparatus, to protect security performance of air interface information sent by a terminal to a base station. In an embodiment, a terminal determines a first message authentication code (MAC) value based on a security key and air interface information, where the security key is a non-access stratum (NAS) security key between the terminal and a core network device; and the terminal sends the air interface information and the first MAC value to a base station.

18 Claims, 8 Drawing Sheets

(51) Int. Cl.
  *H04W 12/03*  (2021.01)
  *H04W 12/041* (2021.01)
  *H04W 12/102* (2021.01)
  *H04W 92/10*  (2009.01)

(56) References Cited

U.S. PATENT DOCUMENTS

| | | | | |
|---|---|---|---|---|
| 2012/0178417 | A1* | 7/2012 | Hapsari | H04W 76/10 |
| | | | | 455/411 |
| 2018/0337901 | A1* | 11/2018 | Zhu | H04W 12/041 |
| 2019/0104134 | A1* | 4/2019 | Lee | H04W 12/10 |
| 2019/0159025 | A1 | 5/2019 | Ben Henda et al. | |
| 2020/0280849 | A1* | 9/2020 | Ito | H04L 63/18 |
| 2022/0070664 | A1* | 3/2022 | Stojanovski | H04W 60/00 |
| 2022/0210648 | A1* | 6/2022 | Li | H04W 12/102 |

FOREIGN PATENT DOCUMENTS

| | | | |
|---|---|---|---|
| CN | 108307389 | A | 7/2018 |
| CN | 109041057 | A | 12/2018 |
| CN | 109104727 | A | 12/2018 |
| CN | 109246684 | A | 1/2019 |
| CN | 109788474 | A | 5/2019 |
| CN | 110048988 | A | 7/2019 |
| CN | 110050475 | A | 7/2019 |
| CN | 110121168 | A | 8/2019 |
| JP | 2019503142 | A | 1/2019 |
| WO | 2012097723 | A1 | 7/2012 |
| WO | 2017117721 | A1 | 7/2017 |
| WO | 2017126721 | A1 | 7/2017 |
| WO | 2018137334 | A1 | 8/2018 |
| WO | 2019030938 | A1 | 2/2019 |
| WO | WO-2019070542 | A1 * | 4/2019 ........... H04L 63/062 |
| WO | 2019096002 | A1 | 5/2019 |

OTHER PUBLICATIONS

Etsi: "ETSI TS 133 501 V16.3.0", Aug. 1, 2018 (Aug. 1, 2018), pp. 2020-2028, XP055854173, total 251 pages.

3GPP TR 33.861 V1.5.0 (Nov. 2019)3rd Generation Partnership Project; Technical Specification Group Services and System Aspects;Study on evolution of Cellular IoT security for the 5G System;(Release 16), total 72 pages.

* cited by examiner

AIR INTERFACE INFORMATION SECURITY PROTECTION METHOD AND APPARATUS

CROSS-REFERENCE TO RELATED APPLICATION

This application is a continuation of International Application No. PCT/CN2020/101714, filed on Jul. 13, 2020, which claims priority to Chinese Application No. 201910870247.1, filed on Sep. 16, 2019 and Chinese Application No. 201910974006.1, filed on Oct. 14, 2019. All of the aforementioned patent applications are hereby incorporated by reference in their entireties.

TECHNICAL FIELD

Embodiments of this application relate to the field of communication technologies, and in particular, to an air interface information security protection method and apparatus.

BACKGROUND

A base station requests or queries some air interface information from a terminal, and the terminal sends the air interface information to the base station. For example, the 3rd generation partnership project (3GPP) defines a radio capability of user equipment (also referred to as a terminal). The air interface information may be the radio capability. The radio capability of the terminal includes parameters such as a power level and a frequency band of the terminal. The base station queries the radio capability of the terminal from the terminal, and the terminal sends the radio capability of the terminal to the base station. However, when the terminal sends the radio capability of the terminal to the base station, the radio capability is vulnerable to be tampered with by an attacker. As a result, the radio capability of the terminal received by the base station is inaccurate. Based on this, integrity protection needs to be performed on the radio capability sent by the terminal to the base station, to ensure that the radio capability sent by the terminal is not tampered with by the attacker.

In a conventional technology, to ensure that a radio capability sent by a terminal to a base station is not tampered with, the terminal needs to set up access stratum (AS) security with the base station. The base station queries the radio capability of the terminal only after the terminal sets up the AS security with the base station. The terminal uses a context of the AS security set up with the base station to protect the radio capability, to prevent the radio capability of the terminal from being tampered with by an attacker.

However, some types of terminals cannot set up the AS security with the base station. Consequently, these terminals cannot use the context of the AS security to protect the radio capability, and the radio capability may be attacked by the attacker.

SUMMARY

Embodiments of this application provide an air interface information security protection method and apparatus, to protect security performance of air interface information sent by a terminal to a base station.
Specific technical solutions provided in the embodiments of this application are as follows:
According to a first aspect, an air interface information security protection method is provided. A terminal determines a first message authentication code (MAC) value based on a non-access stratum (NAS) security key between the terminal and a core network device, and the terminal sends air interface information and the first MAC value to a base station; or the terminal sends air interface information and the first MAC value to the core network device. When the terminal sends the air interface information and the first MAC value to the core network device, the terminal first sends a NAS message to the base station, and the base station forwards the NAS message to the core network device, where the NAS message carries the air interface information and the first MAC value. The first MAC value is used to protect security of the air interface information. For a terminal that does not support or cannot set up AS security with a base station, according to the method provided in this embodiment of this application, when the terminal does not set up the AS security with the base station, security of air interface information can be ensured.

In an embodiment, the terminal determines the first MAC value based on at least two of a security key, the air interface information, or an input parameter, where the security key is the NAS security key between the terminal and the core network device; and the terminal sends the air interface information and the first MAC value to the base station. The air interface information security protection method provided in this embodiment of this application is applicable to any type of terminal, and helps ensure security of air interface information when the terminal exchanges the air interface information with the base station.

In an embodiment, the core network device includes a mobility management entity (MME) in fourth generation (4G) or an access and mobility management function (AMF) in fifth generation (5G); and the security key is any one of the following keys or is a key obtained through derivation based on any one of the following keys: a key Kasme between the terminal and the MME, a key Kamf between the terminal and the AMF, a NAS integrity protection key between the terminal and the core network device, or a NAS confidentiality protection key between the terminal and the core network device.

In an embodiment, the input parameter includes a fresh parameter and/or a cell identifier, and the fresh parameter includes any one or more of the following: a part of or all bits of an uplink NAS count count, a part of or all bits of a downlink NAS count count, or a random number. The input parameter may further include another parameter.

In an embodiment, in sending air interface information and the first MAC value to a base station, the terminal sends a first radio resource control (RRC) message to the base station, where the first RRC message carries the air interface information and the first MAC value.

Alternatively, the terminal sends a second RRC message to the base station, where the second RRC message carries a NAS message, and the NAS message includes the air interface information and the first MAC value.

In an embodiment, the terminal receives a request message from the base station, where the request message carries a second MAC value, and the request message is used to request the air interface information; and the terminal verifies the second MAC value. In this way, the terminal can verify whether the base station is valid based on the second MAC value, so that when no AS security is set up between the terminal and the base station, information transmission security is ensured, and bidirectional verification is implemented.

In an embodiment, the air interface information is a radio capability or a radio capability identifier.

According to a second aspect, an air interface information security protection method is provided. A base station receives an RRC message from a terminal, where the RRC message carries a NAS message, and the NAS message includes air interface information and a first MAC value; the base station sends the NAS message to a core network device; and the base station receives an integrity verification result of the air interface information and/or the air interface information from the core network device. For a terminal that does not support or cannot set up AS security with a base station, according to the method provided in this embodiment of this application, when the terminal does not set up the AS security with the base station, security of air interface information can be ensured.

According to a third aspect, an air interface information security protection method is provided. A base station receives air interface information and a first MAC value from a terminal; the base station sends the air interface information and the first MAC value to a core network device; and the base station receives an integrity verification result of the air interface information from the core network device. For a terminal that does not support or cannot set up AS security with a base station, according to the method provided in this embodiment of this application, when the terminal does not set up the AS security with the base station, security of air interface information can be ensured.

Based on the second aspect and the third aspect, the following possible designs may be further provided.

In an embodiment, the base station sends a first request message to the core network device; the base station receives a second response message of the first request message from the core network device, where the second response message carries a second MAC value; and the base station sends a second request message to the terminal, where the second request message is used to request the air interface information, and the second request message carries the second MAC value. In this way, the terminal can verify whether the base station is valid based on the second MAC value, so that when no AS security is set up between the terminal and the base station, information transmission security is ensured, and bidirectional verification is implemented.

In an embodiment, before the base station sends a first request message to the core network device, the base station determines that the terminal is a control plane cellular internet of things optimization terminal.

In an embodiment, the air interface information is a radio capability or a radio capability identifier.

According to a fourth aspect, an air interface information security protection method is provided. A core network device receives a first request message from a base station, where the first request message carries air interface information and a first MAC value; the core network device verifies integrity of the air interface information based on the first MAC value; and the core network device sends a first response message of the first request to the base station, where the first response message includes an integrity verification result of the air interface information and/or the air interface information. For a terminal that does not support or cannot set up AS security with a base station, according to the method provided in this embodiment of this application, when the terminal does not set up the AS security with the base station, security of air interface information can be ensured.

In an embodiment, the core network device receives a second request message from the base station; the core network device determines a second MAC value based on a security key; and the core network device sends a second response message of the second request message to the base station, where the second response message carries the second MAC value. In this way, the base station may carry the second MAC value when sending an RRC message to the terminal, and the terminal can verify whether the base station is valid based on the second MAC value, so that when no AS security is set up between the terminal and the base station, information transmission security is ensured, and bidirectional verification is implemented.

In an embodiment, the security key includes any one of the following keys or is a key obtained through derivation based on any one of the following keys: a shared key between the terminal and the core network device, an integrity protection key between the terminal and the core network device, or a confidentiality protection key between the terminal and the core network device.

In an embodiment, in determining a second MAC value based on a security key, the core network device determines the second MAC value based on the security key, an input parameter, and the air interface information, where the input parameter includes a fresh parameter and/or a cell identifier, and the fresh parameter includes any one or more of the following: a part of or all bits of an uplink NAS count, a part of or all bits of a downlink NAS count count, or a random number.

In an embodiment, the air interface information is a radio capability or a radio capability identifier.

According to a fifth aspect, an air interface information security protection method is provided. A terminal receives a request message from a core network device, where the request message is used to request air interface information of the terminal; and the terminal sends a response message to the core network, where the response message carries the air interface information of the terminal. For a terminal that does not support or cannot set up AS security with a base station, according to the method provided in this embodiment of this application, when the terminal does not set up the AS security with the base station, air interface information can be obtained from the terminal through a core network, and security of the air interface information can be ensured.

In an embodiment, the air interface information is a radio capability or a radio capability identifier.

In an embodiment, the terminal sets up non-access stratum NAS security with the core network device. In this way, the air interface information sent by the terminal to the core network device may be protected by using a context of the NAS security.

According to a sixth aspect, an air interface information security protection method is provided. A core network device sends a first request message to a terminal, where the first request message is used to request air interface information of the terminal; and the core network device receives a first response message of the first request message from the terminal, where the first response message carries the air interface information of the terminal. For a terminal that does not support or cannot set up AS security with a base station, according to the method provided in this embodiment of this application, when the terminal does not set up the AS security with the base station, air interface information can be obtained from the terminal through a core network, and security of the air interface information can be ensured.

In an embodiment, before a core network device sends a request message to a terminal, the core network device determines that the terminal is a control plane cellular internet of things optimization terminal.

In an embodiment, before a core network device sends a request message to a terminal, the core network device receives a second request message from the base station, where the second request message is used to request the air interface information of the terminal.

In an embodiment, the second request message is used to indicate that the terminal is a control plane cellular internet of things optimization terminal.

In an embodiment, the core network device returns a second response message of the second request message to the base station, where the second response message carries the air interface information of the terminal.

In an embodiment, the air interface information is a radio capability or a radio capability identifier.

In an embodiment, the core network device sets up NAS security with the terminal in advance. In this way, the air interface information sent by the terminal to the core network device may be protected by using a context of the NAS security.

According to a seventh aspect, an air interface information security protection method is provided. A base station sends a request message to a core network device, where the request message is used to request air interface information of a terminal; and the base station receives a response message of the request message from the core network device, where the response message carries the air interface information of the terminal. For a terminal that does not support or cannot set up AS security with a base station, according to the method provided in this embodiment of this application, when the terminal does not set up the AS security with the base station, air interface information can be obtained through a core network, and security of the air interface information can be ensured.

In an embodiment, before a base station sends a request message to a core network device, the base station determines that the terminal is a control plane cellular internet of things optimization terminal.

According to an eighth aspect, an apparatus is provided. The apparatus may be a terminal, an apparatus in a terminal, or an apparatus that can be used together with a terminal. In an embodiment, the apparatus may include modules that are in a one-to-one correspondence with the methods/operations/steps/actions performed by the terminal in the first aspect, or the apparatus may include modules that are in a one-to-one correspondence with the methods/operations/steps/actions performed by the terminal in the fifth aspect. The module may be a hardware circuit, may be software, or may be implemented by a combination of a hardware circuit and software. In a design, the apparatus may include a processing module and a communication module.

For example, when the apparatus is configured to perform the operations performed by the terminal in the first aspect:
the processing module is configured to determine a first MAC value based on a security key and air interface information, where the security key is a NAS security key between the terminal and a core network device; and the communication module is configured to send the air interface information and the first MAC value to a base station.

In an embodiment, the core network device includes an MME or an AMF; and the security key is any one of the following keys or is a key obtained through derivation based on any one of the following keys: a key Kasme between the terminal and the MME, a key Kamf between the terminal and the AMF, a NAS integrity protection key between the terminal and the core network device, or a NAS confidentiality protection key between the terminal and the core network device.

In an embodiment, the processing module is configured to: determine the first MAC value based on the security key, the air interface information, and an input parameter, where the input parameter includes a fresh parameter and/or a cell identifier, and the fresh parameter includes any one or more of the following: a part of or all bits of an uplink NAS count count, a part of or all bits of a downlink NAS count, or a random number.

In an embodiment, the communication module is configured to: send a first RRC message to the base station, where the first RRC message carries the air interface information and the first MAC value; or send a second RRC message to the base station, where the second RRC message carries a NAS message, and the NAS message includes the air interface information and the first MAC value.

In an embodiment, the communication module is further configured to: receive a request message from the base station, where the request message carries a second MAC value, and the request message is used to request the air interface information; and the processing module is further configured to verify the second MAC value.

In an embodiment, the air interface information is a radio capability or a radio capability identifier.

For example, when the apparatus is configured to perform the operations performed by the terminal in the fifth aspect, the communication module is configured to: receive a request message from a core network device, where the request message is used to request air interface information of the terminal; and send a response message to the core network, where the response message carries the air interface information of the terminal. In this way, for a terminal that does not support or cannot set up AS security with a base station, according to the method provided in this embodiment of this application, when the terminal does not set up the AS security with the base station, air interface information can be obtained from the terminal through a core network, and security of the air interface information can be ensured.

In an embodiment, the air interface information is a radio capability or a radio capability identifier.

In an embodiment, the processing module is configured to set up non-access stratum NAS security with the core network device. In this way, the air interface information sent by the terminal to the core network device may be protected by using a context of the NAS security.

According to a ninth aspect, an apparatus is provided. The apparatus may be a base station, an apparatus in a base station, or an apparatus that can be used together with a base station. In a design, the apparatus may include modules that are in a one-to-one correspondence with the methods/operations/steps/actions performed by the base station in the second aspect, the third aspect, or the seventh aspect. In a design, the apparatus may include a processing module and a communication module.

For example, when the apparatus is configured to perform the operations performed by the base station in the second aspect:
the communication module is configured to: receive an RRC message from a terminal, where the RRC message carries a NAS message, and the NAS message includes air interface information and a first MAC value; and send the NAS message to a core network device; and the communication module is further configured to receive an integrity verification result of the air interface information and/or the air interface information from the core network device.

For example, when the apparatus is configured to perform the operations performed by the base station in the third aspect:

the communication module is configured to: receive air interface information and a first MAC value from a terminal; and send the air interface information and the first MAC value to a core network device; and the communication module is further configured to receive an integrity verification result of the air interface information from the core network device.

When the apparatus is configured to perform the operations performed by the base station in the second aspect or the third aspect, optionally, the communication module and the processing module may further perform the following operations.

In an embodiment, the communication module is further configured to: send a first request message to the core network device; receive a second response message of the first request message from the core network device, where the second response message carries a second MAC value; and send a second request message to the terminal, where the second request message is used to request the air interface information, and the second request message carries the second MAC value.

In an embodiment, the processing module is configured to: before the base station sends the first request message to the core network device, determine that the terminal is a control plane cellular internet of things optimization terminal.

For example, when the apparatus is configured to perform the operations performed by the base station in the seventh aspect:

the communication module is configured to: send a request message to a core network device, where the request message is used to request air interface information of a terminal; and receive a response message of the request message from the core network device, where the response message carries the air interface information of the terminal. For a terminal that does not support or cannot set up AS security with a base station, according to the method provided in this embodiment of this application, when the terminal does not set up the AS security with the base station, air interface information can be obtained through a core network, and security of the air interface information can be ensured.

In an embodiment, the processing module is configured to: before the base station sends the request message to the core network device, determine that the terminal is a control plane cellular internet of things optimization terminal.

According to a tenth aspect, an apparatus is provided. The apparatus may be a core network device, an apparatus in a core network device, or an apparatus that can be used together with a core network device. In an embodiment, the apparatus may include modules that are in a one-to-one correspondence with the methods/operations/steps/actions performed by the core network device in the fourth aspect or the sixth aspect. In an embodiment, the apparatus may include a processing module and a communication module.

For example, when the apparatus is configured to perform the operations performed by the core network device in the fourth aspect:

the communication module is configured to receive a first request message from a base station, where the first request message carries air interface information and a first MAC value; the processing module is configured to verify integrity of the air interface information based on the first MAC value; and the communication module is further configured to send a first response message of the first request to the base station, where the first response message includes an integrity verification result of the air interface information and/or the air interface information. For a terminal that does not support or cannot set up AS security with a base station, according to the method provided in this embodiment of this application, when the terminal does not set up the AS security with the base station, security of air interface information can be ensured.

In an embodiment, the communication module is configured to receive a second request message from the base station; the processing module is configured to determine a second MAC value based on a security key; and the communication module is configured to send a second response message of the second request message to the base station, where the second response message carries the second MAC value. In this way, the base station may carry the second MAC value when sending an RRC message to the terminal, and the terminal can verify whether the base station is valid based on the second MAC value, so that when no AS security is set up between the terminal and the base station, information transmission security is ensured, and bidirectional verification is implemented.

In an embodiment, the security key includes any one of the following keys or is a key obtained through derivation based on any one of the following keys: a shared key between the terminal and the core network device, an integrity protection key between the terminal and the core network device, or a confidentiality protection key between the terminal and the core network device.

In an embodiment, the processing module is configured to determine the second MAC value based on the security key, an input parameter, and the air interface information, where the input parameter includes a fresh parameter and/or a cell identifier, and the fresh parameter includes any one or more of the following: a part of or all bits of an uplink NAS count count, a part of or all bits of a downlink NAS count count, or a random number.

For example, when the apparatus is configured to perform the operations performed by the core network device in the sixth aspect:

the communication module is configured to: send a first request message to a terminal, where the first request message is used to request air interface information of the terminal; and receive a first response message of the first request message from the terminal, where the first response message carries the air interface information of the terminal. For a terminal that does not support or cannot set up AS security with a base station, according to the method provided in this embodiment of this application, when the terminal does not set up the AS security with the base station, air interface information can be obtained from the terminal through a core network, and security of the air interface information can be ensured.

In an embodiment, the processing module is configured to: before the core network device sends the request message to the terminal, determine that the terminal is a control plane cellular internet of things optimization terminal.

In an embodiment, the communication module is further configured to: before the core network device sends the request message to the terminal, receive a second request message from the base station, where the second request message is used to request the air interface information of the terminal.

In an embodiment, the second request message is used to indicate that the terminal is a control plane cellular internet of things optimization terminal.

In an embodiment, the communication module is further configured to return a second response message of the second request message to the base station, where the second response message carries the air interface information of the terminal.

In an embodiment, the air interface information is a radio capability or a radio capability identifier.

In an embodiment, the processing module is further configured to set up non-access stratum NAS security with the terminal in advance. In this way, the air interface information sent by the terminal to the core network device may be protected by using a context of the NAS security.

According to an eleventh aspect, an embodiment of this application provides an apparatus. The apparatus includes a communication interface and a processor, and the communication interface is used by the apparatus to communicate with another device, for example, to receive and send data or a signal. For example, the communication interface may be a transceiver, a circuit, a bus, a module, or another type of communication interface, and the another device may be another base station or core network device. The processor is configured to perform the method performed by the terminal described in the first aspect or the fifth aspect. The apparatus may further include a memory, configured to store instructions invoked by the processor. The memory is coupled to the processor. When executing the instructions stored in the memory, the processor can implement the method performed by the terminal described in the first aspect or the second aspect.

According to a twelfth aspect, an embodiment of this application provides an apparatus. The apparatus includes a communication interface and a processor, and the communication interface is used by the apparatus to communicate with another device, for example, to receive and send data or a signal. For example, the communication interface may be a transceiver, a circuit, a bus, a module, or another type of communication interface, and the another device may be another terminal or core network device. The processor is configured to perform the method performed by the base station described in the second aspect, the third aspect, or the seventh aspect. The apparatus may further include a memory, configured to store instructions invoked by the processor. The memory is coupled to the processor. When executing the instructions stored in the memory, the processor can implement the method performed by the base station described in the second aspect, the third aspect, or the seventh aspect.

According to a thirteenth aspect, an embodiment of this application provides an apparatus. The apparatus includes a communication interface and a processor, and the communication interface is used by the apparatus to communicate with another device, for example, to receive and send data or a signal. For example, the communication interface may be a transceiver, a circuit, a bus, a module, or another type of communication interface, and the another device may be another base station or terminal. The processor is configured to perform the method performed by the core network device described in the fourth aspect or the sixth aspect. The apparatus may further include a memory, configured to store instructions invoked by the processor. The memory is coupled to the processor. When executing the instructions stored in the memory, the processor can implement the method performed by the core network device described in the fourth aspect or the sixth aspect.

According to a fourteenth aspect, an embodiment of this application further provides a computer-readable storage medium. The computer storage medium stores computer-readable instructions. When the computer-readable instructions are run on a computer, the computer is enabled to perform the methods in the aspects.

According to a fifteenth aspect, an embodiment of this application further provides a computer program product, including instructions. When the instructions are run on a computer, the computer is enabled to perform the methods in the aspects.

According to a sixteenth aspect, an embodiment of this application provides a chip system. The chip system includes a processor, and may further include a memory, configured to implement the method in any one of the foregoing aspects. The chip system may include a chip, or may include a chip and another discrete device.

According to a seventeenth aspect, an embodiment of this application provides a communication system. The communication system includes the apparatus in the eighth aspect, the apparatus in the ninth aspect, and the apparatus in the tenth aspect.

DESCRIPTION OF EMBODIMENTS

The following describes in detail embodiments of this application with reference to accompanying drawings.

The embodiments of this application provide an air interface information security protection method and apparatus, to protect security performance of air interface information sent by a terminal to a base station. The method and the apparatus are based on a same concept. Because a problemresolving principle of the method is similar to that of the apparatus, mutual reference may be made to implementations of the apparatus and the method. Repeated parts are not described in detail. In descriptions of the embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more. In addition, it should be understood that, in the descriptions of this application, the terms such as "first", "second", and "third" are merely used for distinguishing and description, but cannot be understood as an indication or implication of relative importance or an indication or implication of an order.

The air interface information security protection method provided in the embodiments of this application may be applied to a 4th generation (4G) communication system, for example, a long term evolution (LTE) system; a 5th generation (5G) communication system, for example, a new radio (NR) system; or various future communication systems, for example, a 6th generation (6G) communication system.

Figure 1:
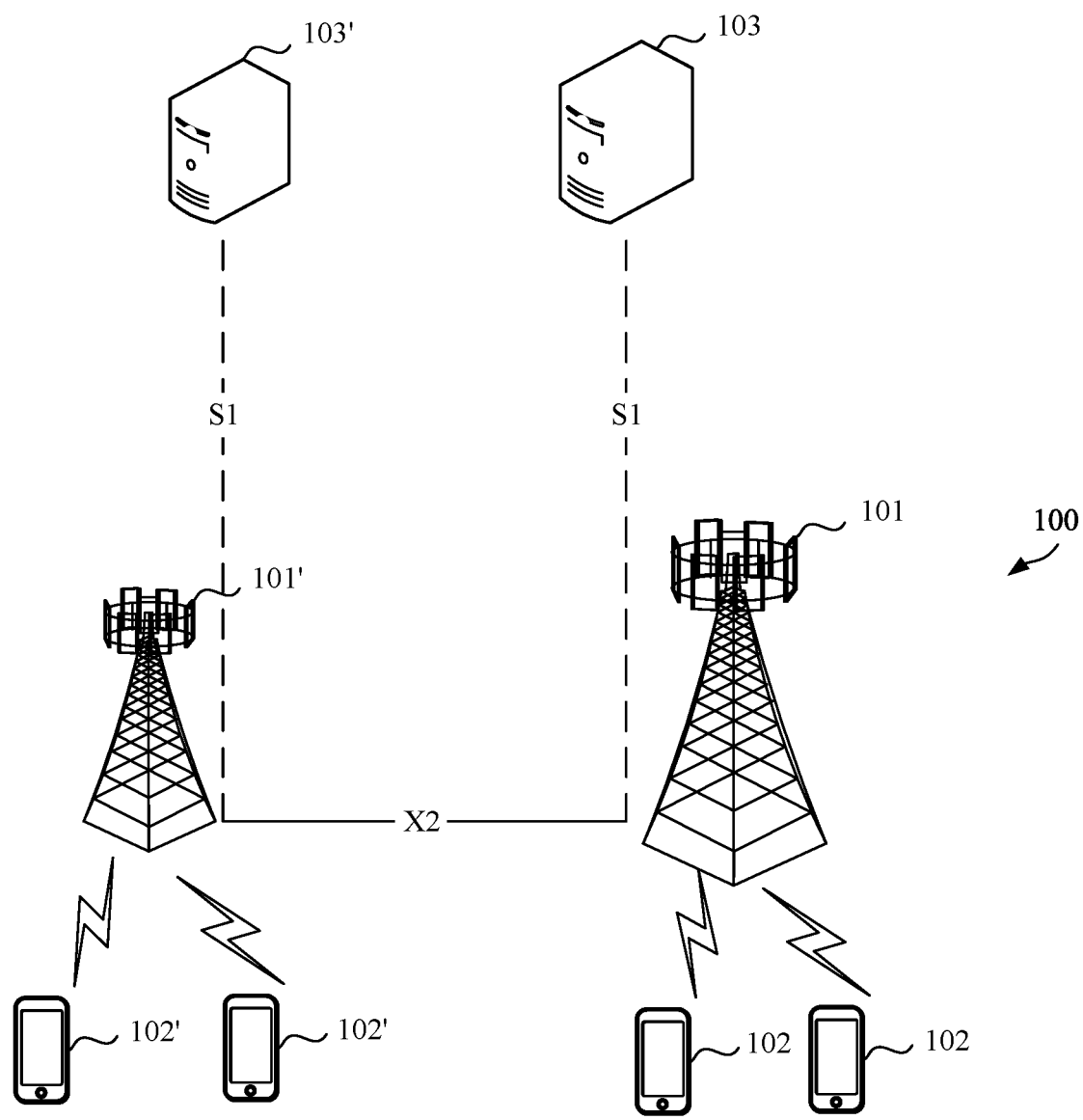
FIG. 1 is a schematic diagram of an architecture of a communication system according to an embodiment of this application.

FIG. 1 shows an architecture of a possible communication system to which an air interface information security protection method according to an embodiment of this application is applicable. As shown in FIG. 1, the communication system 100 includes a terminal, an access network device, and a core network device. The access network device may provide a service for the terminal within coverage. Access network devices are connected for communication through an X2 interface. The access network device is connected to the core network device through an Si interface. For example, as shown in FIG. 1, the communication system 100 includes a base station 101 and a base station 101'. A terminal within coverage of the base station 101 is represented by a terminal 102, and a terminal within coverage of the base station 101' is represented by a terminal 102'. The communication system 100 further includes a core network device 103 and a core network device 103'. Forms of the access network device, the terminal, and the core network device that are included in the communication system are described below by using examples. The base station 101, the terminal 102, and the core network device 103 are used for description.

The base station 101 is a node in a radio access network (RAN), and may also be referred to as an access network device, or may also be referred to as a RAN node (or device). Currently, for example, the base station 101 is a gNB/an NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), a wireless fidelity (WiFi) access point (AP), a network side device in a 5G communication system or a possible future communication system. In this embodiment of this application, an apparatus configured to implement a base station function may be a base station, or may be an apparatus that can support the base station to implement the function, for example, a chip system. The apparatus may be installed in the base station. In the technical solution provided in the embodiments of this application, an example in which the apparatus configured to implement a base station function is a base station is used to describe the technical solution provided in this embodiment of this application.

The terminal 102 is also referred to as user equipment (UE), a mobile station (MS), a mobile terminal (MT), or the like, and is a device that provides voice or data connectivity for a user, or may be an internet of things device. For example, the terminal 102 includes a handheld device or a vehicle-mounted device that has a wireless connection function. Currently, the terminal 102 may be a mobile phone, a tablet computer, a notebook computer, a palmtop computer, a mobile internet device (MID), a wearable device (such as a smart watch, a smart band, or a pedometer), a vehicle-mounted device (such as an automobile, a bicycle, an electric vehicle, an aircraft, a ship, a train, or a high-speed train), a virtual reality (VR) device, an augmented reality (AR) device, a wireless terminal in industrial control, a smart home device (such as a refrigerator, a television, an air conditioner, or an electricity meter), an intelligent robot, a workshop device, a wireless terminal in self driving, a wireless terminal in remote medical surgery, a wireless terminal in a smart grid (smart grid), a wireless terminal in transportation safety, a wireless terminal in a smart city, a wireless terminal in a smart home, a flight device (such as an intelligent robot, a hot balloon, an unmanned aerial vehicle, or an aircraft), or the like. In this embodiment of this application, an apparatus configured to implement a terminal function may be a terminal, or may be an apparatus that can support the terminal to implement the function, for example, a chip system. The apparatus may be installed in the terminal. In this embodiment of this application, the chip system may include a chip, or may include a chip and another discrete component. In the technical solution provided in this embodiment of this application, an example in which the apparatus configured to implement a terminal function is a terminal or UE is used to describe the technical solution provided in this embodiment of this application.

The core network device 103 is used for communication between the base station 101 and an IP network. The IP network may be the internet, a private IP network, or another data network. For example, in a long term evolution (LTE) communication system, the core network device 103 includes a mobility management entity (MME)/a serving gateway (S-GW). A 5G system is used as an example. The core network device 103 is an access and mobility management function (AMF).

It may be understood that the communication system 100 may further include a larger quantity of terminals 101, base stations 102, or core network devices 103.

In an embodiment of this application, air interface information is information obtained by the base station from the terminal through an air interface.

For example, the air interface information may be a radio capability of the terminal or a radio capability identifier. The radio capability identifier is used to identify a specific radio capability. The following uses an example in which the air interface information is a radio capability for description. It may be understood that the solution that is related to the air interface information and that is described in this embodiment of this application may be replaced with a solution related to a radio capability or a radio capability identifier. The radio capability of the terminal includes parameters such as a power level and a frequency band of the terminal. In an embodiment, during initial registration of the terminal, the terminal does not carry a radio capability to the core network device. Consequently, the base station cannot obtain the radio capability of the terminal from an N2 message (for example, an initial context setup message) of the core network. In this case, the base station can only initiate a radio capability query message to the terminal, and the terminal receives the radio capability query message from the base station, and returns the radio capability to the base station. Because a data volume of the radio capability of the terminal is relatively large, to prevent the terminal from frequently sending the capability to the base station, the base station sends the radio capability obtained by query to the core network device for storage. The radio capability is stored in the core network device for a long time until the terminal deregisters. The radio capability of the terminal is stored in the core network device. When a base station handover occurs when the terminal moves, or the terminal enters a connected state from an idle state, the base station may directly obtain the radio capability of the terminal from the core network device, and does not need to query the terminal again.

To ensure security when the terminal sends the air interface information to the base station, the 3GPP stipulates that after the terminal sets up AS security with the base station, the terminal uses a context of the AS security to protect the air interface information. As types of terminals in a communication system evolve, some types of terminals do not support or do not need to set up AS security with a base station. For example, some internet of things (IoT) devices, for example, a control plane cellular internet of things (CIoT) optimization terminal, cannot set up AS security with a base station. The control plane CIoT optimization terminal includes a control plane CIoT 4G optimization (control plane CIoT EPS optimization) terminal or a control plane CIoT 5G optimization terminal. The term EPS refers to an evolved packet system. For a terminal that does not support or cannot set up AS security with a base station, when the terminal sends air interface information to the base station, the terminal cannot use a context of the AS to encrypt and protect the air interface information. As a result, the air interface information may be attacked by an attacker.

The air interface information security protection method provided in this embodiment of this application is applicable to any type of terminal, and helps ensure security of air interface information when the terminal exchanges the air interface information with the base station. Optionally, for a terminal that does not support or cannot set up AS security with a base station, according to the method provided in this embodiment of this application, when the terminal does not set up the AS security with the base station, security of air interface information can be ensured.

Figure 2:
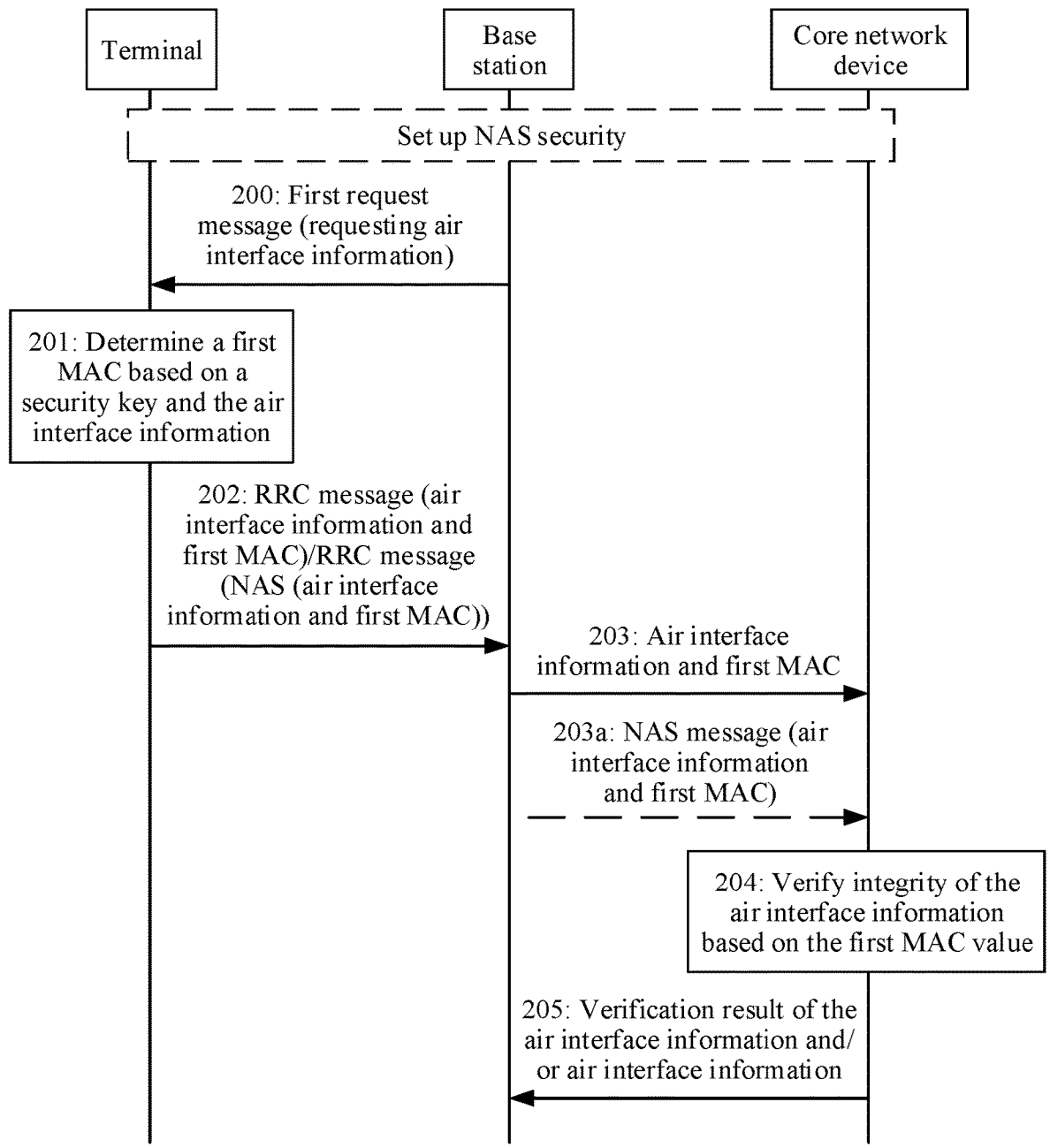
FIG. 2 is a first schematic flowchart of an air interface information security protection method according to an embodiment of this application.

As shown in FIG. 2, a process of an air interface information security protection method provided in this embodiment of this application is described as follows.

At block S201, a terminal determines a first MAC value based on a security key and air interface information.

The security key is a NAS security key between the terminal and a core network device.

NAS security may be set up between the terminal and the core network device in advance. For all operations of setting up the NAS security between the terminal and the core network device in the embodiments of this application, refer to descriptions in the embodiment in FIG. 2.

If the core network device is an MME in 4G, when NAS security is set up between the terminal and the MME, the terminal and the MME share a NAS security key, and the NAS security key may be a key Kasme between the terminal and the MME. If the core network device is an AMF in 5G, when NAS security is set up between the terminal and the AMF, the terminal and the AMF share a security key, and the NAS security key may be a key Kamf between the terminal and the AMF. The NAS security key between the terminal and the core network device may alternatively be an integrity protection key Kansint or a confidentiality protection key Knasenc.

The NAS security key between the terminal and the core network device may be any one or more of Kasme, Kamf, Kansint, or Knasenc. Alternatively, the NAS security key between the terminal and the core network device may be a key obtained through derivation based on one or more of Kasme, Kamf, Kansint, or Knasenc.

Optionally, block S200 is included before block S201.

At block S200, a base station sends a request message to the terminal, where the request message is denoted as a first request message, and the terminal receives the first request message from the base station.

The first request message is used to request the air interface information of the terminal. After receiving the request message sent by the base station, the terminal performs integrity protection on the air interface information.

In an embodiment, the terminal determines a MAC value based on the NAS security key between the terminal and the core network device and the air interface information, where the MAC value is denoted as the first MAC value. Determining the MAC value may also be understood as calculating the MAC value.

In an embodiment, when determining the first MAC value based on the security key and the air interface information, the terminal may further determine the first MAC value with reference to an input parameter. For example, the terminal may perform hash calculation based on the security key, the input parameter, and the air interface information, to obtain the first MAC value. The security key and/or the input parameter may be determined based on a context of the NAS security between the terminal and the core network device. The input parameter may include a cell identifier and/or a fresh parameter. The fresh parameter may be any one or more of the following: a part of or all bits of an uplink NAS count, a part of or all bits of a downlink NAS count, or a random number. The input parameter for calculating the first MAC value is not limited in this application.

At block S202, the terminal sends the air interface information and the first MAC value to the base station.

The terminal may send an RRC message to the base station, where the RRC message carries the air interface information and the first MAC value. In this case, after receiving the RRC message from the terminal, the base station may obtain the air interface information and the first MAC value from the RRC message.

Alternatively, the terminal may include a NAS message in the RRC message sent to the base station. For example, the RRC message carries the NAS message, and the NAS message carries the air interface information and the first MAC value. The base station forwards the NAS message to the core network device.

Based on the foregoing two cases, actions performed by the base station side are described by using S203 and S203a.

At block S203, after receiving the air interface information and the first MAC value from the terminal, the base station sends the air interface information and the first MAC value to the core network device, and the core network device receives the air interface information and the first MAC value from the base station.

The air interface information and the first MAC value may be carried in the RRC message. The base station receives the RRC message from the terminal, and obtains the air interface information and the first MAC value from the RRC message.

In an embodiment, the base station may send a request message to the core network device, where the request message is denoted as a second request message, and the second request message carries the air interface information and the first MAC value.

The second request message is used to request the core network device to verify integrity of the air interface information.

At block S203a, the base station receives the RRC message from the terminal, where the RRC message carries the NAS message, and the NAS message carries the air interface information and the first MAC value. The base station sends the NAS message to the core network device, and the core network device receives the NAS message from the base station.

The RRC message may be understood as a response message, and the response message is used to respond to the request message that is sent by the base station to the terminal and that is used to request the air interface information of the terminal. The base station may directly forward the NAS message received from the terminal to the core network device.

In an embodiment, the NAS message sent by the base station to the core network is the second request message; or the base station sends the second request message to the core network device, and the second request message carries the NAS message. The second request message is used to request the core network device to verify integrity of the air interface information and/or return the air interface information.

Before sending the air interface information and the first MAC value to the core network device, the base station may further determine a type of the terminal. In an embodiment, the base station determines whether the terminal is a terminal that cannot set up AS security, or the base station determines whether the terminal is a control plane cellular internet of things optimization terminal.

At block S204, after receiving the second request message from the base station, the core network device verifies integrity of the air interface information based on the first MAC value.

In an embodiment, the core network device sets up the NAS security with the terminal in advance, and the core network device verifies integrity of the air interface information by using the context of the NAS security and the first MAC value.

At block S205, the core network device sends an integrity verification result of the air interface information and/or the air interface information to the base station.

For example, if the core network device receives the second request message from the base station, where the second request message carries the air interface information and the first MAC value, the core network device sends a response message of the second request message to the base station, where the response message is denoted as a second response message. The second response message carries the integrity verification result of the air interface information.

If the core network device receives the second request message from the base station, where the second request message carries the NAS message, and the NAS message carries the air interface information and the first MAC value, the core network device returns a second response message of the second request message to the base station, and the second response message carries the integrity verification result of the air interface information and/or the air interface information. In this way, the base station can obtain the air interface information of the terminal and the integrity verification result of the air interface information. In an embodiment, if the verification on the air interface information fails, the core network device may also feed back only the integrity verification result of the air interface information and does not feed back the air interface information.

In conclusion, the terminal implements security protection for the air interface information by using the NAS security key of the core network device. Security performance of the air interface information sent by the terminal can be ensured when the terminal cannot set up the AS security with the base station.

Figure 3:
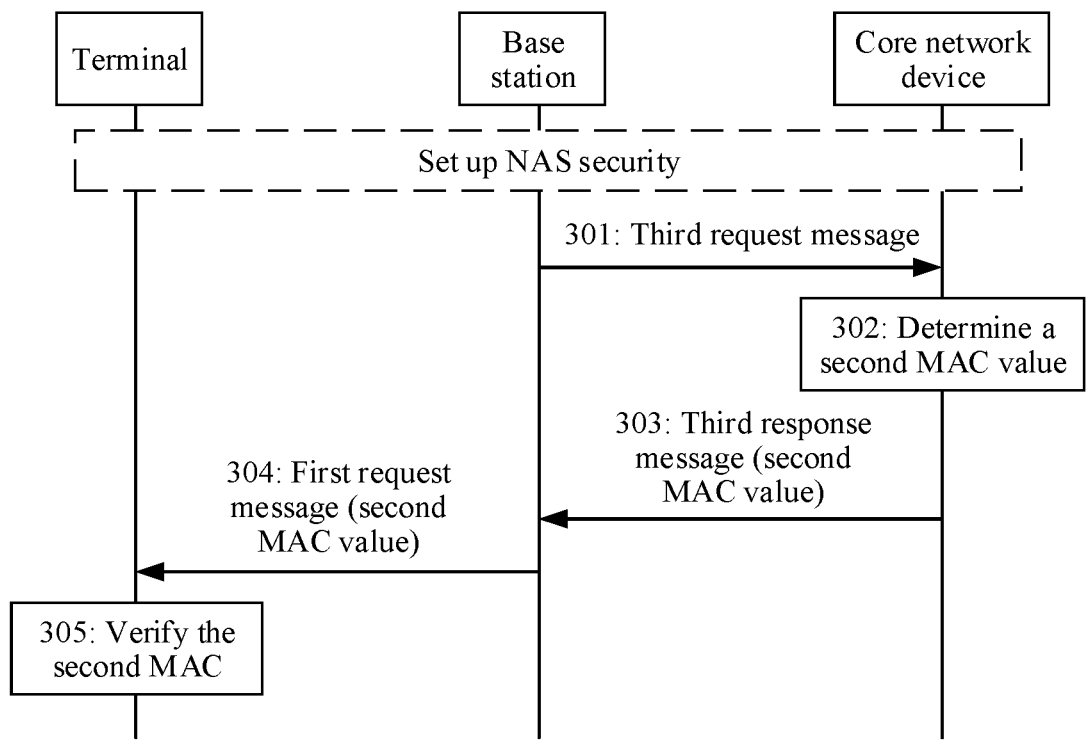
FIG. 3 is a first schematic flowchart of a downlink security protection method according to an embodiment of this application.

Based on a same technical concept, the terminal may further verify whether the base station is valid. As shown in FIG. 3, a specific method is described as follows.

At block S301, a base station sends a request message to a core network device. For distinguishing, the request message herein is denoted as a third request message. The core network device receives the third request message from the base station.

In an embodiment, before sending the third request message to the core network device, the base station determines a type of a terminal. Specifically, the base station determines whether the terminal is a terminal that cannot set up AS security, or the base station determines whether the terminal is a control plane cellular internet of things optimization terminal.

At block S302, after receiving the third request message from the base station, the core network device determines a second MAC value.

NAS security may be set up between the core network device and the terminal in advance. The core network device determines the second MAC value based on a context of the NAS security.

At block S303, the core network device sends a third response message of the third request message to the base station, where the third response message carries the second MAC value. The base station receives the third response message from the core network device.

The base station obtains the second MAC value from the third response message.

At block S304, the base station sends a first request message to the terminal, and the terminal receives the first request message from the base station.

The first request message carries the second MAC value. The second MAC value is used by the terminal to verify the base station. The first request message is used to request air interface information. The first request message may be an RRC message.

At block S305, after receiving the first request message from the base station, the terminal verifies correctness of the second MAC value. If the verification succeeds, a first MAC value is determined, and subsequent operations are continued.

In this way, the terminal can verify whether the base station is valid based on the second MAC value, so that when no AS security is set up between the terminal and the base station, information transmission security is ensured, and bidirectional verification is implemented.

Figure 4:
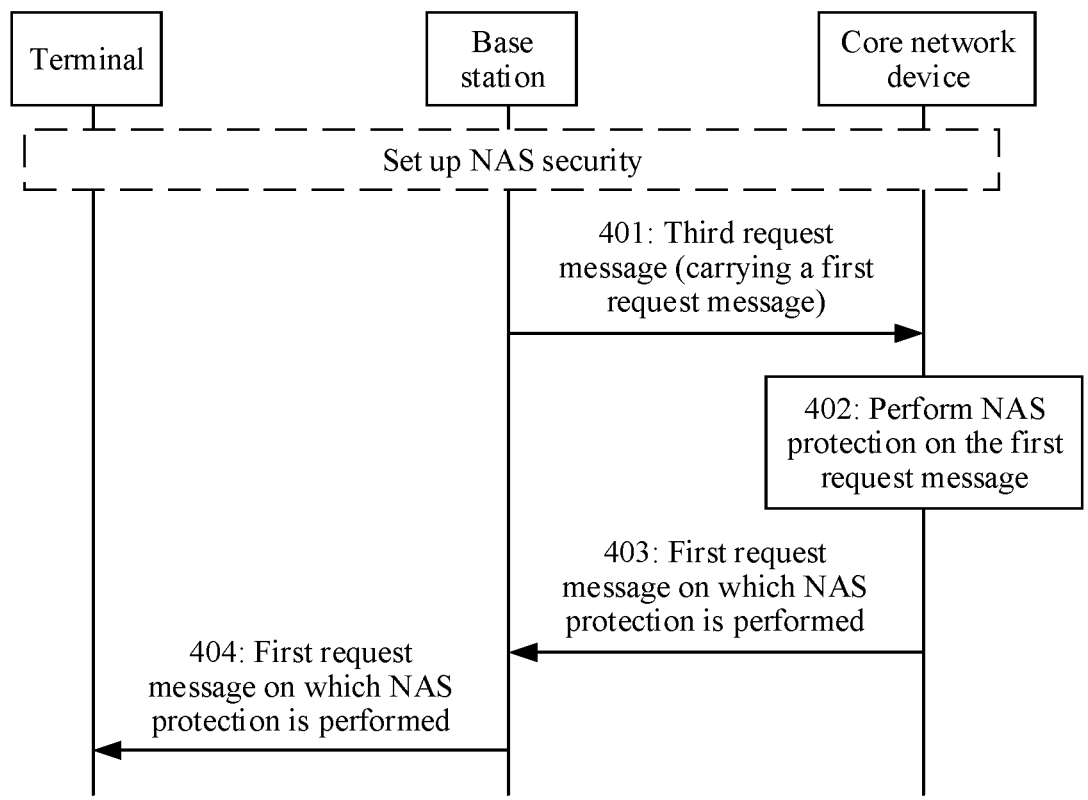
FIG. 4 is a second schematic flowchart of a downlink security protection method according to an embodiment of this application.

Based on a same technical concept, another method for the terminal to verify whether the base station is valid is that shown in FIG. 4.

At block S401, a base station sends a third request message to a core network device, and the core network device receives the third request message from the base station, where the third request message carries a first request message.

For example, the first request message is an RRC message that is to be sent by the base station to a terminal and that is used to request air interface information.

In an embodiment, before sending the third request message to the core network device, the base station determines a type of the terminal. Specifically, the base station determines whether the terminal is a terminal that cannot set up AS security, or the base station determines whether the terminal is a control plane cellular internet of things optimization terminal.

At block S402, the core network determines a second MAC value.

The second MAC value is used to perform NAS protection on the first request message carried in the third request message. NAS security may be set up between the core network device and the terminal in advance. The core network device determines the second MAC value based on a context of the NAS security.

At block S403, the core network device sends the first request message on which NAS protection is applied to the base station, and the base station receives the first request message on which NAS protection is applied from the core network device.

The first request message on which NAS protection is applied means that the first request message carries the second MAC value.

At block S404, the base station sends the first request message on which NAS protection is applied to the terminal, and the terminal receives the first request message on which NAS protection is applied from the base station.

In this way, the core network performs NAS protection on the first request message, so that when no AS security is set up between the terminal and the base station, information transmission security can be ensured, and bidirectional verification can be implemented.

Figure 5:
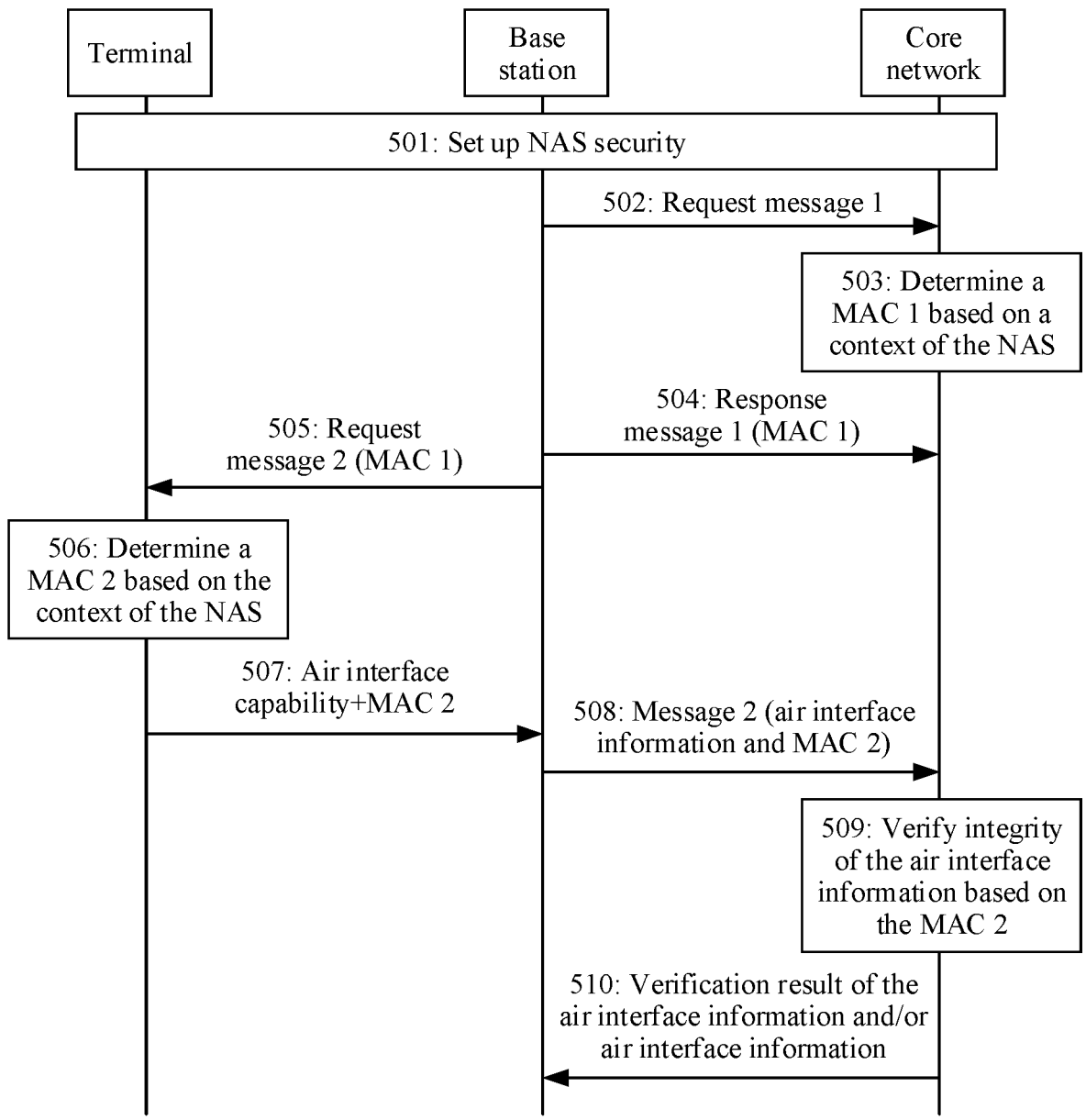
FIG. 5 is a second schematic flowchart of an air interface information security protection method according to an embodiment of this application.

As shown in FIG. 5, an example in which the air interface information of the terminal is a radio capability is used below to further describe the air interface information security protection method. Any plurality of consecutive or inconsecutive operations in the following descriptions may form the technical solutions to be protected in this application, and remaining operations are optional operations.

At block S501, NAS security is set up between a terminal and a core network device.

At block S502, a base station sends a request message 1 to the core network device, and the core network device receives the request message 1 from the base station.

At block S503, the core network device determines a MAC 1 value.

The core network device calculates the MAC 1 value based on a context of the NAS security between the core network device and the terminal.

At block S504, the core network device sends a response message 1 to the base station, and the base station receives the response message 1 from the core network device.

The response message 1 is used to respond to the request message 1, and the response message 1 carries the MAC 1 value.

At block S505, the base station sends a request message 2 to the terminal, and the terminal receives the request message 2 from the base station.

The request message 2 is used to request a radio capability of the terminal. Optionally, the request message 2 carries the MAC 1.

At block S506, the terminal determines a MAC 2 value.

The terminal may determine the MAC 2 value based on the context of the NAS security set up between the terminal and the core network device.

In an embodiment, the terminal first verifies correctness of the MAC 1, and determines the MAC 2 value if the verification succeeds.

At block S507, terminal sends information about the radio capability to the base station, where the information about the radio capability may carry the MAC 2. The base station receives the information about the radio capability from the terminal.

At block S508, the base station sends a request message 2 to the core network device, and the core network device receives the request message 2 from the base station.

The request message 2 carries the radio capability and the MAC 2, and is used to request to verify integrity of the radio capability.

At block S509, the core network device verifies integrity of the radio capability based on the MAC 2 and the context of the NAS security.

At block S510, the core network device returns a verification result to the base station, and the base station receives the verification result of the radio capability from the core network device.

In an embodiment, the request message 1 sent by the base station to the core network device in S502 carries the request message 2. In S503, the core network device performs NAS security protection on the request message 2, and in S504, the core network device returns the request message 2 on which NAS security protection is performed to the base station. In S505, the base station sends the request message 2 on which NAS security protection is performed to the terminal.

Similarly, in an embodiment, the radio capability sent by the terminal to the base station in S507 may be encapsulated in a NAS message, and the base station forwards the NAS message to the core network device in S508. In S509, the core network parses the radio capability and the MAC 2 in the NAS message, and returns a verification result and/or the radio capability of the terminal to the base station.

Figure 6:
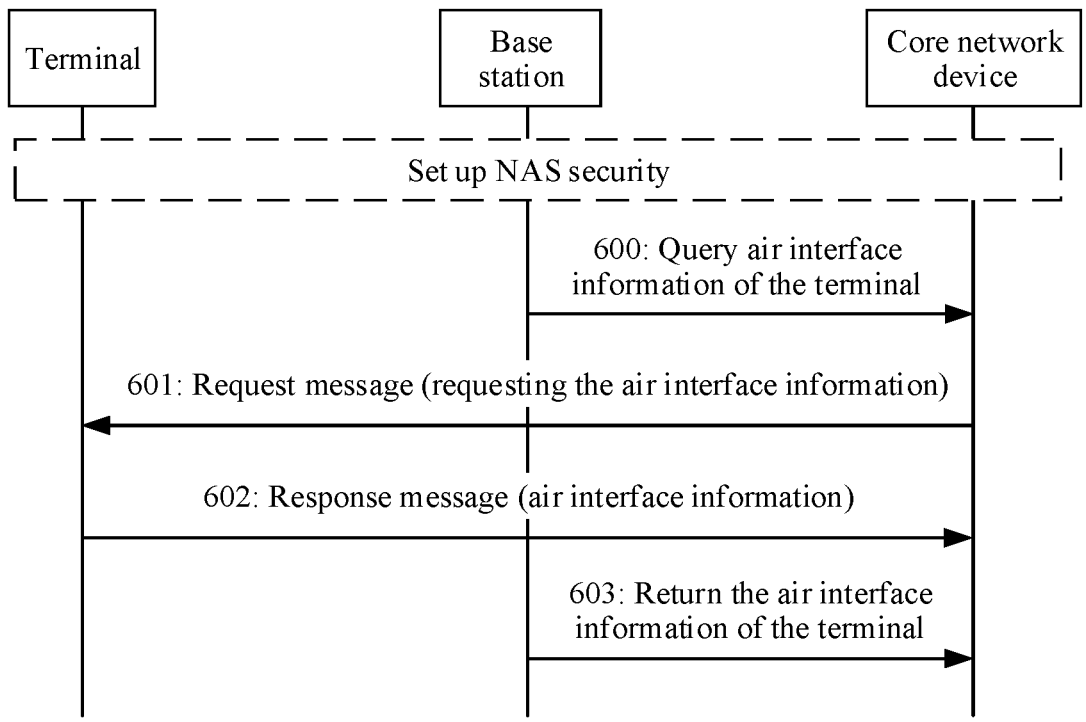
FIG. 6 is a third schematic flowchart of an air interface information security protection method according to an embodiment of this application.

Based on a same technical concept, as shown in FIG. 6, an embodiment of this application further provides another air interface information security protection method.

At block S601, a core network device sends a request message to a terminal, and the terminal receives the request message from the core network device.

The request message is used to request air interface information of the terminal.

At block S602, the terminal returns a response message of the request message to the core network device, and the core network device receives the response message from the terminal.

The response message carries the air interface information of the terminal. The response message is a NAS message and is a message on which NAS security protection is performed.

Before block S601, in an embodiment, the NAS security is set up between the terminal and the core network. Before sending the request message to the terminal, the core network device determines that a type of the terminal is a control plane cellular internet of things optimization terminal. In other words, the core network device determines that AS security cannot be set up between the terminal and a base station. Consequently, the air interface information may be attacked when the terminal directly sends the air interface information to the base station, and security cannot be ensured. In this case, the core network device directly requests the air interface information from the terminal by using a context of the NAS security, and the terminal returns the air interface information to the core network device based on the context of the NAS security. In this way, when the base station needs to obtain the air interface information of the terminal, the base station may request the air interface information of the terminal from the core network.

The core network device may perform the operation of S601 after the terminal registers with the core network device.

In an embodiment, S600 is further included before S601.

At block S600, the base station sends a request message to the core network device. The core network receives the request message from the base station.

The request message is used to request to query the air interface information of the terminal. In an embodiment, the base station determines the type of the terminal; and when determining that the type of the terminal is a control plane cellular internet of things optimization terminal, the base station sends the request message to the core network device. The base station determines that the terminal cannot report the air interface information by using the AS security, and requests the air interface information of the terminal from the core network.

S604 is further included after S602.

At block S604, the core network device sends the air interface information of the terminal to the base station, and the base station receives the air interface information of the terminal from the core network device.

In an embodiment, based on S601 and S602, the core network obtains the air interface information of the terminal from the terminal, and the core network device may store the air interface information of the terminal. When receiving the request message that is sent by the base station and that is used to request the air interface information of the terminal, the core network device sends the already stored air interface information of the terminal to the base station.

In conclusion, the air interface information of the terminal is obtained from the terminal through the core network, the air interface information of the terminal can be protected by using the context of the NAS security, and security performance of the air interface information of the terminal is protected when the terminal and the base station cannot set up the AS security.

Figure 6A:
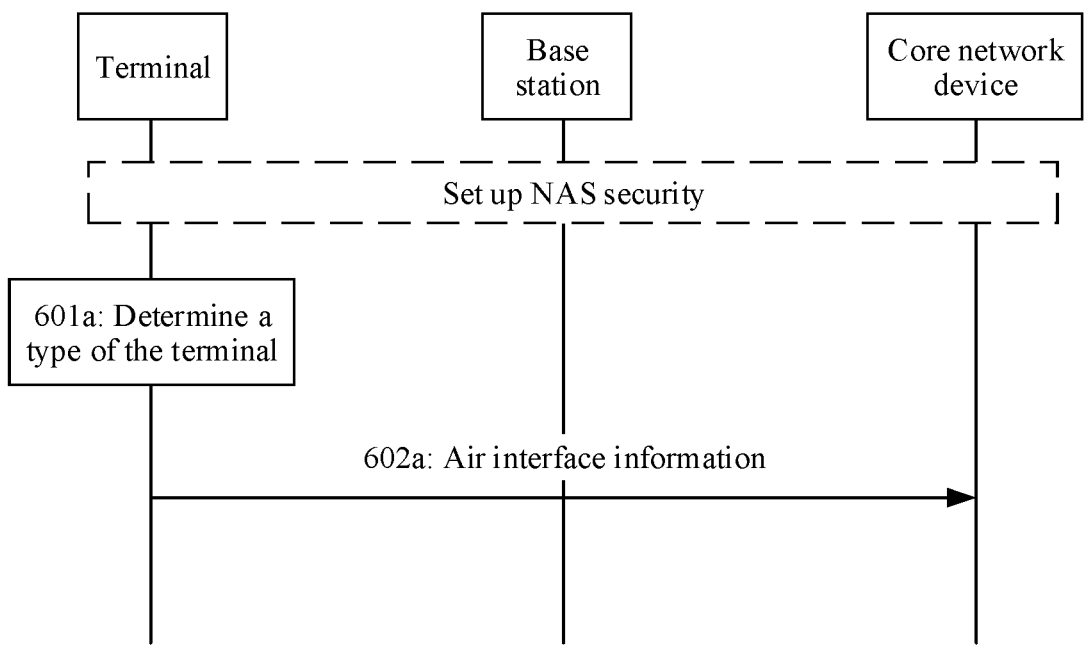
FIG. 6a is a fourth schematic flowchart of an air interface information security protection method according to an embodiment of this application.

Based on a same technical concept, as shown in FIG. 6a, an embodiment of this application further provides another air interface information security protection method.

At block S601a, a terminal determines a type of the terminal.

The terminal determines that the type of the terminal is a control plane cellular internet of things optimization terminal, or a terminal that cannot set up AS security.

At block S602a, the terminal sends air interface information to a core network device, and the core network device receives the air interface information from the terminal.

Before block S601a, the method may further include the following step: NAS security is set up between the terminal and the core network. After determining the type of the terminal, the terminal learns that the AS security cannot be set up between the terminal and a base station. Consequently, the air interface information may be attacked when the terminal directly sends the air interface information to the base station, and security cannot be ensured. In this case, the terminal sends the air interface information to the core network device by using a NAS message. In this way, when the base station needs to obtain the air interface information of the terminal, the base station may request the air interface information of the terminal from the core network.

Figure 7:
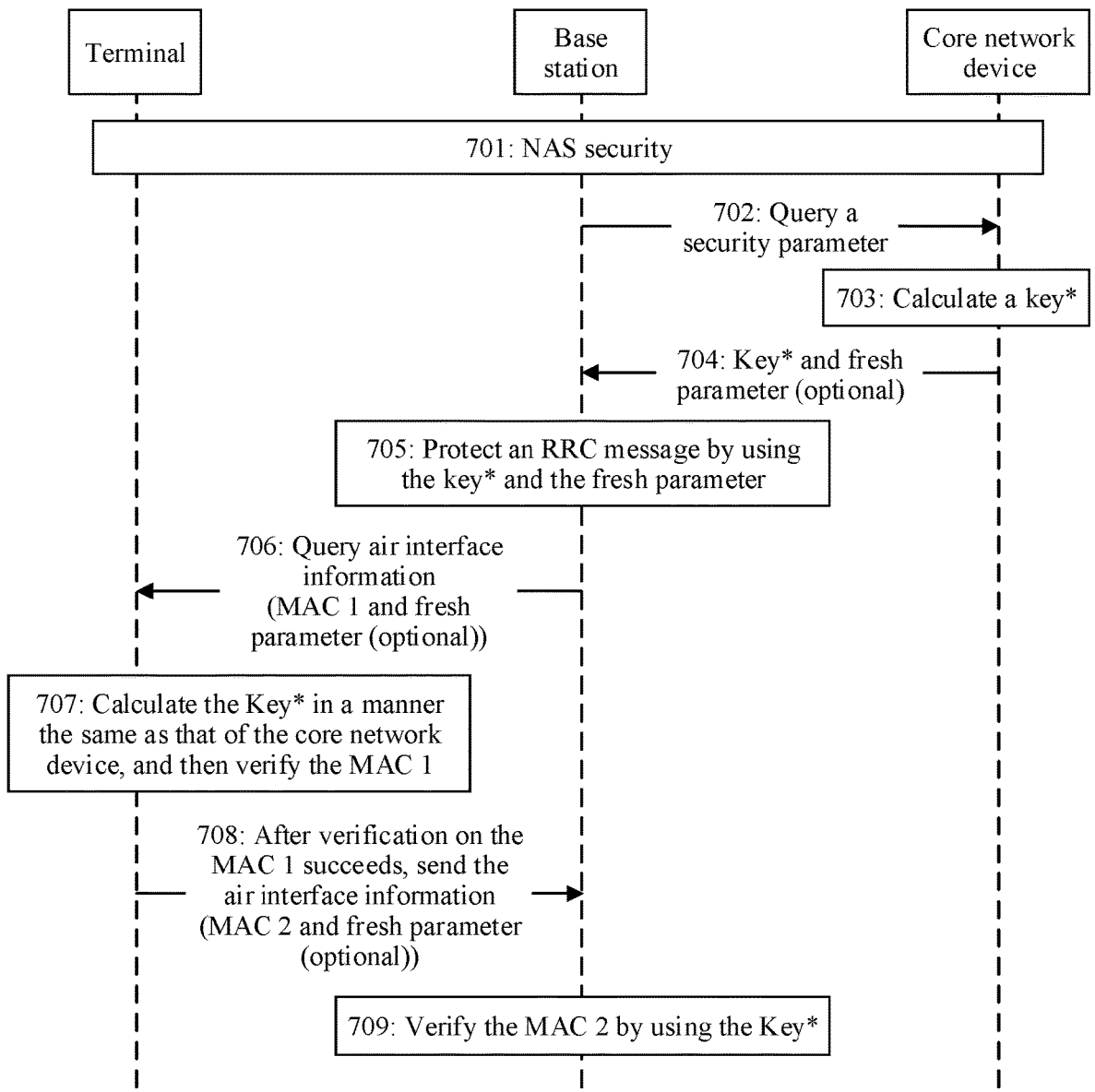
FIG. 7 is a fifth schematic flowchart of an air interface information security protection method according to an embodiment of this application.

Based on a same technical concept, as shown in FIG. 7, the air interface information security protection method provided in this embodiment of this application may be further implemented by using the following steps. Any plurality of consecutive or inconsecutive steps in the following descriptions may form the technical solutions to be protected in this application, and remaining steps are optional steps.

At block S701, a terminal sets up NAS security with a core network device.

At block S702, a base station sends a request message to the core network device, and the core network device receives the request message from the base station.

The request message is used to request a security parameter, for example, a MAC value or a security key used for requesting to query air interface information.

In an embodiment, before sending the request message, the base station determines a type of the terminal. Specifically, the base station determines whether the terminal is a terminal that cannot set up AS security, or the base station determines whether the terminal is a control plane cellular internet of things optimization terminal. If the base station determines that the terminal is the terminal that cannot set up AS security or is the control plane cellular internet of things optimization terminal, the base station sends the request message to the core network device.

At block S703, the core network device derives a base station key Key*, where the key may be obtained through derivation by using Kamf or Kasme. This is not limited.

At block S704, the core network device returns the Key* to the base station, and the base station receives the Key* from the core network device.

In an embodiment, a fresh parameter may be further returned to the base station, and may be returned by using an N2 message.

At block S705, the base station protects an RRC message of UE by using the Key*.

At block S706, the base station sends the request message to the terminal, where the request message is used to request to query the air interface information of the terminal.

The request message is protected by using the Key*, and the request message may carry a MAC 3 value, the fresh parameter, and/or the like.

At block S707, after receiving the request message from the base station, the terminal calculates the Key* in a manner the same as that of the core network device.

The MAC 3 value carried in the request message in S706 is verified. If the verification succeeds, block S708 is performed.

At block S708, the terminal sends the air interface information of the terminal that is protected by using the Key* to the base station, and the base station receives the air interface information from the terminal.

The air interface information sent by the terminal may carry a MAC 4 and/or the fresh parameter.

At block S709, after receiving the air interface information from the terminal, the base station verifies the MAC 4 by using the Key*.

After the verification succeeds, the air interface information of the terminal is obtained.

It should be noted that names of some messages or signaling in the embodiments of this application are merely examples of names, and may also be referred to as other names. This is not limited in this application. For example, a request message 1, a request message 2, a key request, a response message 1, a response message 2, or a key response each may be referred to as another name. In addition, the foregoing descriptions are provided based on a key agreement scenario in an internet of vehicles, and may also be provided based on a specific key agreement scenario. This is not limited.

In the foregoing embodiments provided in this application, the methods provided in the embodiments of this application are separately described from a perspective of interaction between the terminal, the base station, and the core network device. To implement functions in the methods provided in the embodiments of this application, the terminal, the base station, and the core network device may include a hardware structure and/or a software module, and implement the foregoing functions in a form of the hardware structure, the software module, or a combination of the hardware structure and the software module. Whether a function of the foregoing functions is performed by using the hardware structure, the software module, or the combination of the hardware structure and the software module depends on specific applications and design constraint conditions of the technical solutions.

Figure 8:
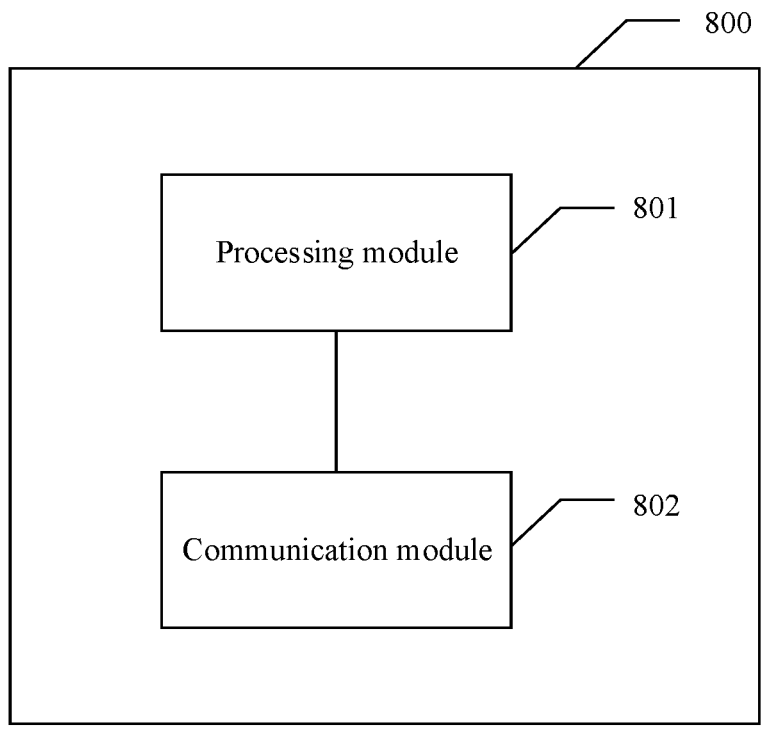
FIG. 8 is a first schematic diagram of a structure of an apparatus according to an embodiment of this application.

As shown in FIG. 8, based on a same technical concept, an embodiment of this application further provides an apparatus 800. The apparatus 800 may be a terminal, a base station, or a core network device, may be an apparatus in a terminal, a base station, or a core network device, or may be an apparatus that can be used together with a terminal, a base station, or a core network device. In a design, the apparatus 800 may include modules that are in a one-to-one correspondence with the methods/operations/steps/actions performed by the terminal, the base station, or the core network device in the foregoing method embodiments. The modules may be implemented by using a hardware circuit, software, or a combination of a hardware circuit and software. In a design, the apparatus may include a processing module 801 and a communication module 802.

When the apparatus is configured to perform the method performed by the terminal:

the processing module 801 is configured to determine a first MAC value based on a security key and air interface information, where the security key is a NAS security key between the terminal and a core network device; and the communication module 802 is configured to send the air interface information and the first MAC value to a base station.

When the apparatus is configured to perform the method performed by the base station:

the communication module 802 is configured to: receive an RRC message from a terminal, where the RRC message carries a NAS message, and the NAS message includes air interface information and a first MAC value; and send the NAS message to a core network device; and the communication module 802 is further configured to receive an integrity verification result of the air interface information and/or the air interface information from the core network device.

Alternatively, when the apparatus is configured to perform the method performed by the base station:

the communication module 802 is configured to: receive air interface information and a first MAC value from a terminal; and send the air interface information and the first MAC value to a core network device; and the communication module 802 is further configured to receive an integrity verification result of the air interface information from the core network device.

In an embodiment, the processing module 801 is configured to: before the base station sends a first request message to the core network device, determine that the terminal is a control plane cellular internet of things optimization terminal.

When the apparatus is configured to perform the method performed by the core network device:

the communication module 802 is configured to receive a first request message from a base station, where the first request message carries air interface information and a first MAC value;

the processing module 801 is configured to verify integrity of the air interface information based on the first MAC value; and the communication module 802 is further configured to send a first response message of the first request to the base station, where the first response message includes an integrity verification result of the air interface information and/or the air interface information.

The processing module 801 and the communication module 802 may be further configured to perform other corresponding steps or operations performed by the terminal, the base station, or the core network device in the foregoing method embodiments. Details are not described herein again.

Division into the modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 9:
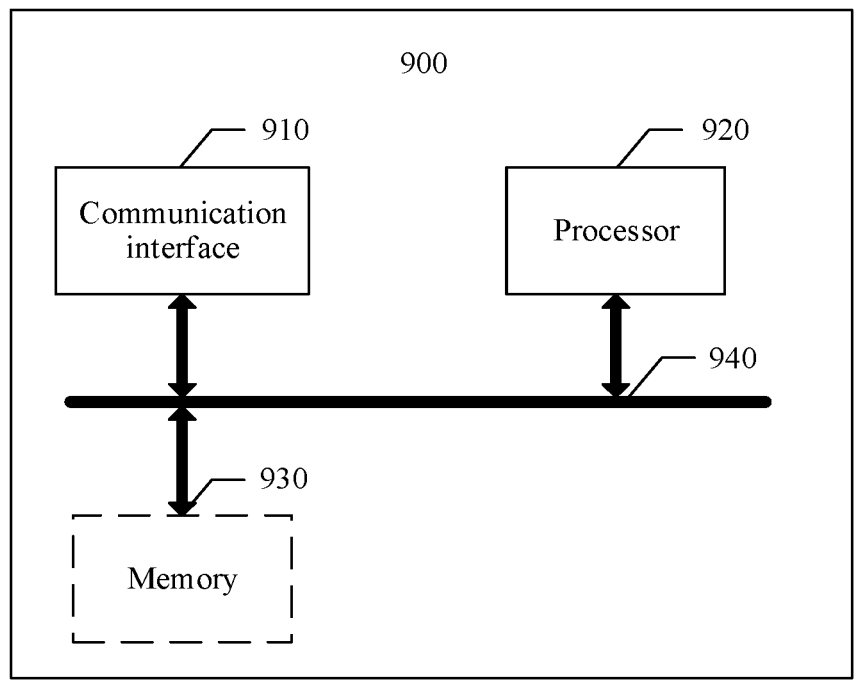
FIG. 9 is a second schematic diagram of a structure of an apparatus according to an embodiment of this application.

FIG. 9 shows an apparatus 900 according to an embodiment of this application. The apparatus 900 is configured to implement functions of the terminal, the base station, or the core network device in the foregoing methods. The apparatus 900 may be a terminal, a base station, or a core network device, may be an apparatus in a terminal, a base station, or a core network device, or may be an apparatus that can be used together with a terminal, a base station, or a core network device.

The apparatus may be a chip system. In this embodiment of this application, the chip system may include a chip, or may include a chip and another discrete component. The apparatus 900 includes at least one processor 920, configured to implement functions of the terminal, the base station, or the core network device in the methods provided in the embodiments of this application. The apparatus 900 may further include a communication interface 910.

In this embodiment of this application, the communication interface may be a transceiver, a circuit, a bus, a module, or a communication interface of another type, and is configured to communicate with another device through a transmission medium. For example, the communication interface 910 is used by an apparatus in the apparatus 900 to communicate with another device.

For example, when the apparatus 900 is a terminal, the another device may be a base station or a core network device. When the apparatus 900 is a base station, the another apparatus may be a terminal or a core network device. When the apparatus 900 is a core network device, the another device may be a terminal or a base station. The processor 920 receives and sends data through the communication interface 910, and is configured to implement the methods in the foregoing method embodiments.

For example, when functions of the terminal are implemented, the processor 920 is configured to determine a first MAC value based on a security key and air interface information, where the security key is a NAS security key between the terminal and a core network device; and the communication interface 910 is configured to send the air interface information and the first MAC value to a base station.

When functions of the base station are implemented, the communication interface 910 is configured to receive an RRC message from a terminal, where the RRC message carries a NAS message, and the NAS message includes air interface information and a first MAC value; configured to send the NAS message to a core network device; and further configured to receive an integrity verification result of the air interface information and/or the air interface information from the core network device.

Alternatively, when functions of the base station are implemented, the communication interface 910 is configured to receive air interface information and a first MAC value from a terminal; and configured to send the air interface information and the first MAC value to a core network device; or further configured to receive an integrity verification result of the air interface information from the core network device.

When functions of the core network device are implemented, the communication interface 910 is configured to receive a first request message from a base station, where the first request message carries air interface information and a first MAC value; the processor 920 is configured to verify integrity of the air interface information based on the first MAC value; and the communication interface 910 is further configured to send a first response message of the first request to the base station, where the first response message includes an integrity verification result of the air interface information and/or the air interface information.

The processor 920 and the communication interface 910 may be further configured to perform other corresponding steps or operations performed by the terminal, the base station, or the core network device in the foregoing method embodiments. Details are not described herein again.

The apparatus 900 may further include at least one memory 930, configured to store program instructions and/or data. The memory 930 is coupled to the processor 920. The coupling in this embodiment of this application may be an indirect coupling or a communication connection between apparatuses, units, or modules in an electrical form, a mechanical form, or another form, and is used for information exchange between the apparatuses, the units, or the modules. The processor 920 may cooperate with the memory 930. The processor 920 may execute the program instructions stored in the memory 930. At least one of the at least one memory may be included in the processor.

A specific connection medium between the communication interface 910, the processor 920, and the memory 930 is not limited in this embodiment of this application. In this embodiment of this application, the memory 930, the communication interface 920, and the transceiver 910 are connected through a bus 940 in FIG. 9. The bus is represented by a bold line in FIG. 9. A connection manner of other components is merely an example for description, and is not limited thereto. The bus may be classified into an address bus, a data bus, a control bus, and the like. For ease of representation, only one thick line is used to represent the bus in FIG. 9, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed by a hardware processor, or may be performed by using a combination of hardware in the processor and a software module.

In the embodiments of this application, the memory may be a nonvolatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in the embodiments of this application may alternatively be a circuit or any other apparatus that can implement a storage function, and is configured to store the program instructions and/or the data.

Figure 10:
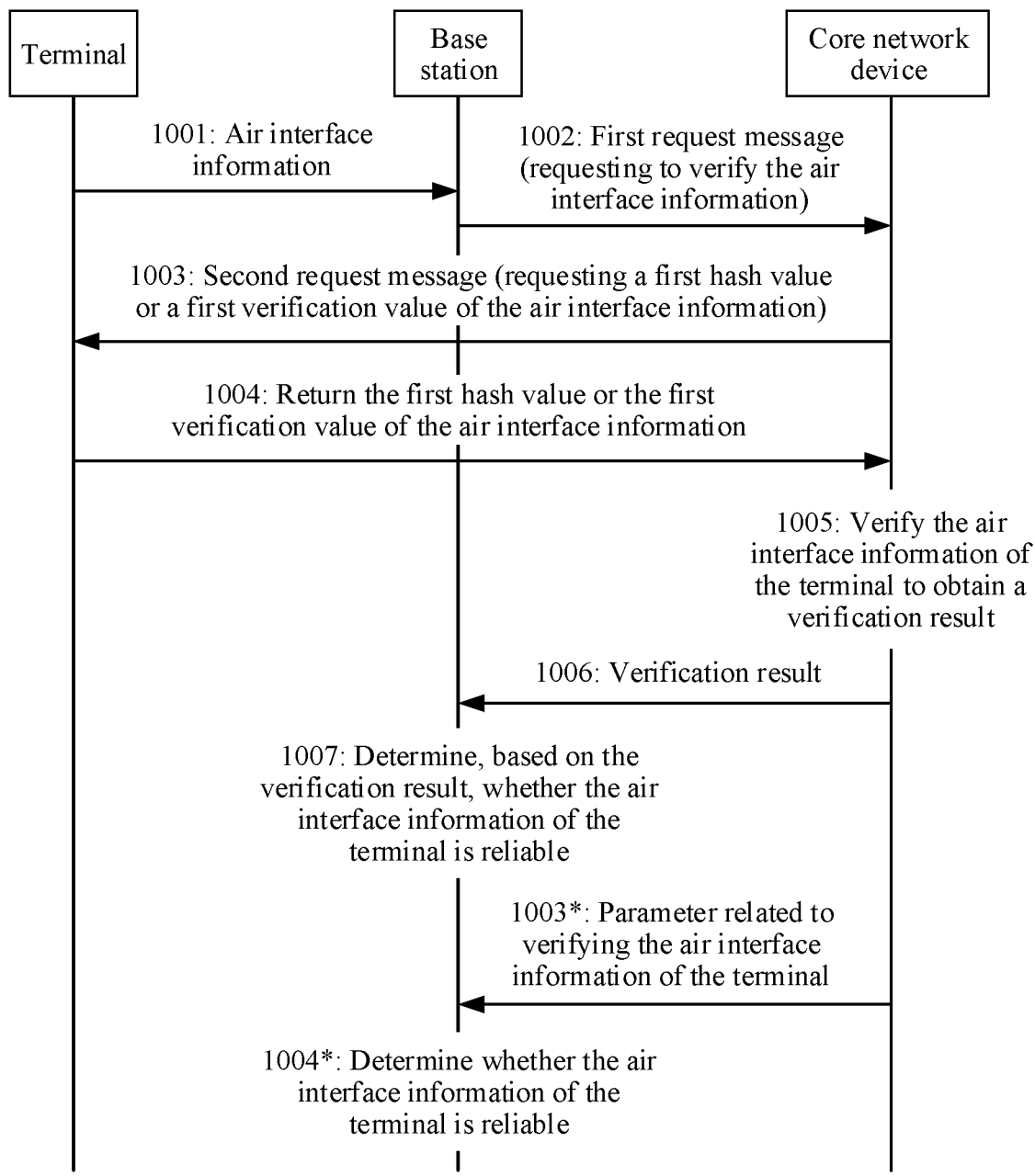
FIG. 10 is a sixth schematic flowchart of an air interface information security protection method according to an embodiment of this application.

Based on a same technical concept, as shown in FIG. 10, the air interface information security protection method provided in this embodiment of this application may be further implemented by using the following steps. Any plurality of consecutive or inconsecutive steps in the following descriptions may form the technical solutions to be protected in this application, and remaining steps are optional steps.

At block S1001, a terminal sends air interface information of the terminal to a base station, and the base station receives the air interface information of the terminal from the terminal.

For explanations of the air interface information, refer to the foregoing descriptions. In an embodiment, the terminal may further send a hash value of the air interface information of the terminal to the base station or a core network device. For distinguishing, the hash value is denoted as a first hash value herein. Alternatively, the terminal may further send a verification value of the air interface information of the terminal to the base station or the core network device. For distinguishing, the verification value is denoted as a first verification value herein.

At block S1002, the base station sends a request message to the core network device, and the core network device receives the request message from the base station.

The request message is denoted as a first request message, and the first request message may be used to request to verify the air interface information of the terminal, or the first request message may be used to request a parameter related to verifying the air interface information of the terminal.

If the base station receives the first hash value or the first verification value of the air interface information of the terminal from the terminal in S1001, the base station may further send the first hash value or the first verification value of the air interface information of the terminal to the core network device. The core network device receives the first hash value or the first verification value from the base station.

In this embodiment of this application, NAS security is set up between the terminal and the core network in advance.

After receiving the request message from the base station, the core network device may verify the air interface information of the terminal in several optional operation manners. Details are as follows.

If the core network device does not obtain the first hash value or the first verification value of the air interface information of the terminal, blocks S1003 and S1004 are performed.

If the core network device already obtains the first hash value or the first verification value of the air interface information of the terminal, blocks S1003 and S1004 are omitted, and subsequent steps are performed.

At block S1003, the core network device sends a request message to the terminal, where the request message is denoted as a second request message herein for distinguishing from the request message in S1002. The terminal receives the second request message from the core network device.

The second request message is used to request the first hash value or the first verification value of the air interface information of the terminal.

At block S1004, the terminal returns the first hash value or the first verification value of the air interface information of the terminal to the core network device, and the core network device receives the first hash value or the first verification value of the air interface information of the terminal from the terminal.

At block S1005, the core network device verifies the air interface information of the terminal to obtain a verification result.

In an embodiment, the core network device may calculate a second hash value based on the air interface information of the terminal, and compare the second hash value with the first hash value. If the second hash value is consistent with the first hash value, it indicates that the air interface information of the terminal is not tampered with; otherwise, it indicates that the air interface information of the terminal may be tampered with.

Alternatively, the core network device may calculate a second verification value based on the air interface information of the terminal, and compare the second verification value with the first verification value. If the second verification value is consistent with the first verification value, it indicates that the air interface information of the terminal is not tampered with; otherwise, it indicates that the air interface information of the terminal may be tampered with.

At block S1006, the core network device sends the verification result to the base station, and the base station receives the verification result from the core network device.

At block S1007, the base station determines, based on the verification result, whether the air interface information of the terminal is reliable.

If the verification result is that the verification succeeds (for example, the first hash value is consistent with the second hash value, or the first verification value is consistent with the second verification value), the base station determines that the air interface information of the terminal is not tampered with. If the verification result is that the verification fails (for example, the first hash value is inconsistent with the second hash value, or the first verification value is inconsistent with the second verification value), the base station determines that the air interface information of the terminal may be tampered with, that the air interface information has a risk, and not to use the air interface information.

In an embodiment, if the first request message in S1002 is used to request the parameter related to verifying the air interface information of the terminal, the following steps are performed.

At block S1003*, the core network device sends, to the base station, the parameter related to verifying the air interface information of the terminal, and the base station receives the parameter from the core network device.

At block S1004*, the base station determines whether the air interface information of the terminal is reliable.

The parameter related to verifying the air interface information of the terminal may be the first hash value of the air interface information of the terminal. The base station may calculate the second hash value based on the air interface information of the terminal, and compare the second hash value with the first hash value. If the second hash value is consistent with the first hash value, it indicates that the air interface information of the terminal is not tampered with; otherwise, it indicates that the air interface information of the terminal may be tampered with.

Alternatively, the parameter related to verifying the air interface information of the terminal may be the first verification value of the air interface information of the terminal. The base station may calculate the second verification value based on the air interface information of the terminal, and compare the second verification value with the first verification value. If the second verification value is consistent with the first verification value, it indicates that the air interface information of the terminal is not tampered with; otherwise, it indicates that the air interface information of the terminal may be tampered with.

Because no AS security is set up between the terminal and the base station, security of the air interface information of the terminal can be ensured by requesting the core network device to verify the air interface information of the terminal.

The embodiment shown in FIG. 10 may be implemented through the apparatus shown in FIG. 8 or FIG. 9.

In the methods provided in the foregoing embodiments of this application, some or all of the described operations and functions performed by the terminal, the base station, or the core network device may be implemented by using a chip or an integrated circuit.

To implement the functions of the apparatus in FIG. 8 or FIG. 9, an embodiment of this application further provides a chip. The chip includes a processor, configured to support the apparatus to implement the functions related to the terminal, the base station, or the core network device in the foregoing method embodiments. In a possible design, the chip is connected to a memory or the chip includes a memory, and the memory is configured to store program instructions and data that are necessary for the apparatus.

An embodiment of this application provides a computer storage medium. The computer storage medium stores a computer program, and the computer program includes instructions used to perform the method embodiments provided in the foregoing embodiments.

An embodiment of this application further provides a computer program product including instructions. When the computer program product runs on a computer, the computer is enabled to perform the method embodiments provided in the foregoing embodiments.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn of the basic inventive concept. Therefore, the following claims are intended to be construed as to cover the embodiments and all changes and modifications falling within the scope of this application.

It is clear that persons skilled in the art can make various modifications and variations to the embodiments of this application without departing from the spirit and scope of the embodiments of this application. In this case, this application is intended to cover these modifications and variations of the embodiments of this application provided that they fall within the scope of protection defined by the following claims and their equivalent technologies.

What is claimed is:

1. A method for protecting air interface information, comprising:
    determining, by a terminal, a first message authentication code (MAC) value based on a security key and air interface information, wherein the security key is a non-access stratum (NAS) security key between the terminal and a core network device, wherein the air interface information includes a power level and a frequency band of the terminal; and
    sending, by the terminal, the air interface information and the first MAC value to a base station or to the core network device.

2. The method according to claim 1, wherein the core network device comprises a mobility management entity (MME) or an access and mobility management function (AMF); and
    the security key is obtained based on any one of following keys: a key Kasme between the terminal and the MME, a key Kamf between the terminal and the AMF, a NAS integrity protection key between the terminal and the core network device, or a NAS confidentiality protection key between the terminal and the core network device.

3. The method according to claim 1, wherein the determining the first MAC value based on the security key and the air interface information comprises:
    determining, by the terminal, the first MAC value based on the security key, the air interface information, and an input parameter, wherein
    the input parameter comprises a fresh parameter and/or a cell identifier, and the fresh parameter comprises one or more of a part of or all bits of an uplink NAS count, a part of or all bits of a downlink NAS count, or a random number.

4. The method according to claim 1, wherein the sending, by the terminal, the air interface information and the first MAC value to the base station comprises:
    sending, by the terminal, a first radio resource control (RRC) message to the base station, wherein the first RRC message carries the air interface information and the first MAC value; or
    sending, by the terminal, a second RRC message to the base station, wherein the second RRC message carries a NAS message having the air interface information and the first MAC value.

5. The method according to claim 1, further comprising:
    receiving, by the terminal, a request message from the base station to request the air interface information, wherein the request message carries a second MAC value; and
    verifying, by the terminal, the second MAC value.

6. The method according to claim 1, wherein the air interface information is a radio capability or a radio capability identifier.

7. An apparatus operating as a terminal or used in a terminal, comprising:
    a processor configured to determine a first message authentication code (MAC) value based on a security key and air interface information, wherein the security key is a non-access stratum (NAS) security key between the terminal and a core network device, wherein the air interface information includes a power level and a frequency band of the terminal; and
    a transmitter configured to send the air interface information and the first MAC value to a base station.

8. The apparatus according to claim 7, wherein the core network device comprises a mobility management entity (MME) or an access and mobility management function (AMF); and
    the security key is obtained based on any one of following keys: a key Kasme between the terminal and the MME, a key Kamf between the terminal and the AMF, a NAS integrity protection key between the terminal and the core network device, or a NAS confidentiality protection key between the terminal and the core network device.

9. The apparatus according to claim 7, wherein the processor is configured to:
   determine the first MAC value based on the security key, the air interface information, and an input parameter, wherein
   the input parameter comprises a fresh parameter and/or a cell identifier, and the fresh parameter comprises one or more of a part of or all bits of an uplink NAS count count, a part of or all bits of a downlink NAS count count, or a random number.

10. The apparatus according to claim 7, wherein the transmitter is configured to:
   send a first radio resource control (RRC) message to the base station, wherein the first RRC message carries the air interface information and the first MAC value; or
   send a second RRC message to the base station, wherein the second RRC message carries a NAS message having the air interface information and the first MAC value.

11. The apparatus according to claim 7, wherein the transmitter is further configured to:
   receive a request message from the base station to request the air interface information, wherein the request message carries a second MAC value; and
   the processor is further configured to verify the second MAC value.

12. The apparatus according to claim 7, wherein the air interface information is a radio capability or a radio capability identifier.

13. A non-transitory machine-readable storage medium having instructions stored therein, which when executed by a processor, cause the processor to perform operations, the operations comprising:
   determining, by a terminal, a first message authentication code (MAC) value based on a security key and air interface information, wherein the security key is a non-access stratum (NAS) security key between the terminal and a core network device, wherein the air interface information includes a power level and a frequency band of the terminal; and
   sending, by the terminal, the air interface information and the first MAC value to a base station or to the core network device.

14. The non-transitory machine-readable storage medium according to claim 13, wherein the core network device comprises a mobility management entity (MME) or an access and mobility management function (AMF); and
   the security key is obtained based on any one of following keys: a key Kasme between the terminal and the MME, a key Kamf between the terminal and the AMF, a NAS integrity protection key between the terminal and the core network device, or a NAS confidentiality protection key between the terminal and the core network device.

15. The non-transitory machine-readable storage medium according to claim 13, wherein the determining the first MAC value based on the security key and the air interface information comprises:
   determining, by the terminal, the first MAC value based on the security key, the air interface information, and an input parameter, wherein
   the input parameter comprises a fresh parameter and/or a cell identifier, and the fresh parameter comprises one or more of a part of or all bits of an uplink NAS count, a part of or all bits of a downlink NAS count, or a random number.

16. The non-transitory machine-readable storage medium according to claim 13, wherein the sending the air interface information and the first MAC value to the base station comprises:
   sending, by the terminal, a first radio resource control (RRC) message to the base station, wherein the first RRC message carries the air interface information and the first MAC value; or
   sending, by the terminal, a second RRC message to the base station, wherein the second RRC message carries a NAS message having the air interface information and the first MAC value.

17. The non-transitory machine-readable storage medium according to claim 13, the operations further comprising:
   receiving, by the terminal, a request message from the base station to request the air interface information, wherein the request message carries a second MAC value; and
   verifying, by the terminal, the second MAC value.

18. The non-transitory machine-readable storage medium according to claim 13, wherein the air interface information is a radio capability or a radio capability identifier.

* * * * *